March 3, 1964 F. DURAND 3,122,939
POWER SPLITTING REDUCTION GEAR
Filed July 30, 1962 3 Sheets-Sheet 1

Inventor:
François Durand
by:
Michael S. Striker

March 3, 1964 F. DURAND 3,122,939
POWER SPLITTING REDUCTION GEAR
Filed July 30, 1962 3 Sheets-Sheet 2
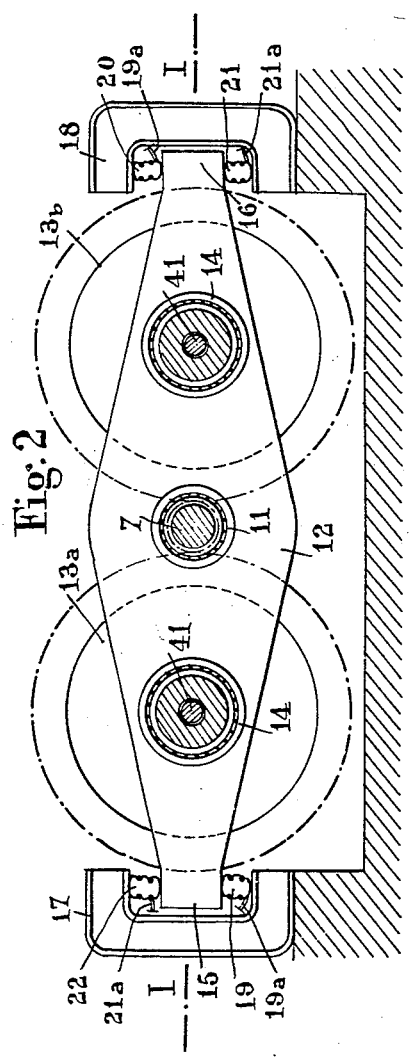
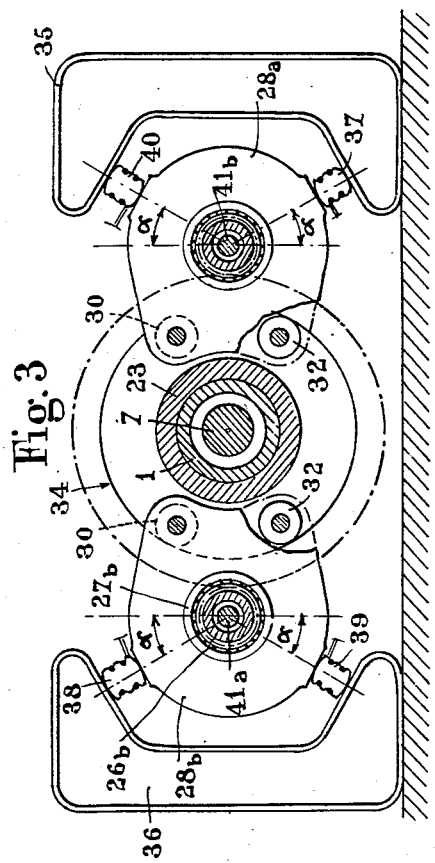
INVENTOR
FRANCOIS DURAND March 3, 1964    F. DURAND    3,122,939
POWER SPLITTING REDUCTION GEAR Filed July 30, 1962    3 Sheets-Sheet 3

Inventor
François Durand
by: Michael S. Striker
Atty

United States Patent Office 3,122,939
Patented Mar. 3, 1964

3,122,939
POWER SPLITTING REDUCTION GEAR
François Durand, 108 Blvd. Carnot, Le Vesinet, France
Filed July 30, 1962, Ser. No. 213,379
Claims priority, application France Aug. 1, 1961
6 Claims. (Cl. 74—411)

This invention relates to reduction gears within which the power of the input pinion is split up between a plurality of trains of gears and then wholly restored to the gearwheel which is keyed to the output shaft.

As is well known, such reduction gears have the advantage of benig considerably lighter and more compact than reduction gears which employ a single kinematic sequence without power splitting. However, for a power splitting reduction gear to give entire satisfaction, it is necessary for the various pinions and gearwheels to be correctly aligned. It is also necessary that there be an equitable apportionment of the power between the various gear trains. On the other hand, this requires highly accurate machining together with the use of very rigid casings. In addition, delicate adjustments are needed if the above mentioned requirements are to be fulfilled.

It is the object of this invention to circumvent the need for extremely accurate machining and delicate adjustments, yet to ensure that the various parts are mutually aligned automatically, independently of the casing, and that the input power is split up between the different gear trains. Under these conditions, the function of the reduction gear casing becomes confined to protecting the gears from abrasive dust and the surroundings from projections of lubricant. In the device according to this invention, the casing can be replaced by a bell of transparent plastic material and the foundations on which the reduction gear reposes can undergo elastic or thermal distortions such as occur when a reduction gear is operating within the hull of a ship.

The present invention accordingly has for its object to provide a power splitting reduction gear which comprises a high speed input shaft supporting two pinions in mesh with gearwheels which, through the medium of further pinions drive another gearwheel keyed to the low speed output shaft, characterized in that said high speed input shaft carries an arm which is arranged in the plane of symmetry of the pinions provided on said input shaft and which supports gearwheels meshing with those pinions, such support being provided through the medium of self-aligning bearing located in said symmetry plane, said beam furthermore bearing against fixed points through the instrumentality of interconnected hydraulic capsules, the gearwheels driven by the pinions of the input shaft being coupled with pinions which mesh with the gearwheel of the output shaft and which are respectively journaled in a flange positioned in the symmetry plane taken through the toothed rims of the latter pinions and each flange being provided with followers which roll along guiding tracks provided on said output shaft gearwheel and bear against fixed points through the medium of interconnected hydraulic capsules.

By reason of the special design of this reduction gear, there is automatically produced therein a correct alignment of the various rotating components, together with a distribution of the power between the different gear trains.

A specific embodiment of a reduction gear according to this invention will be described hereinafter with reference to the accompanying drawing, which is filed by way of example only and not of limitation. The reduction gear illustrated thereon is one wherein the power is split between two gear trains, but it will be manifest to those skilled in the art that gear trains can be executed wherein the power is split in the same way between three or four gear trains, without departing from the scope of the invention.

Referring to the drawing filed herewith:

FIGURES 2 and 3 are cross-sectional views of the same reduction gear, taken respectively through the lines II—II and III—III of FIGURE 1.

Figure 1:
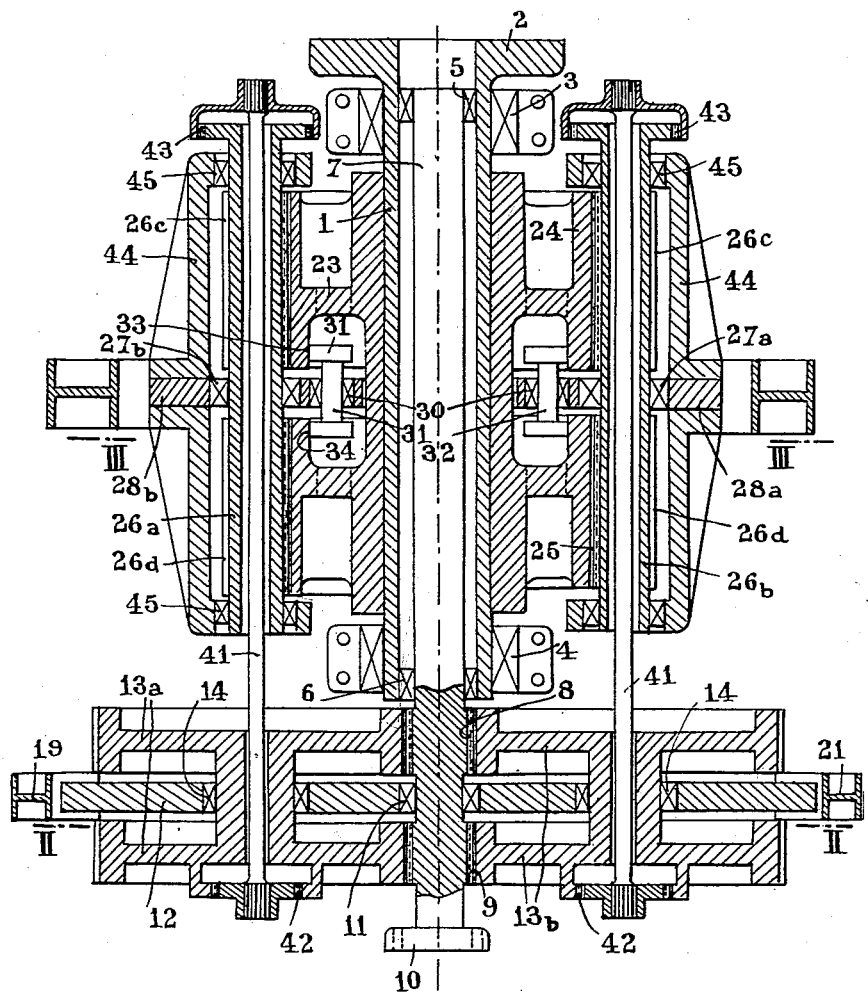
FIGURE 1 illustrates a reduction gear according to this invention, as seen in sectional view taken through a horizontal plane passing through the mainshaft and the gearwheel train shafts, said plane following the lines I—I of FIGURE 2.

The low speed output shaft 1 of the reduction gear with its coupling flange 2 is supported in two roller-mounted self-aligning bearings 3 and 4. Said shaft is hollow and has disposed within it the high speed input shaft 7 of the reduction gear, which shaft is supported in two bearings 5 and 6 positioned inside shaft 1.

Driving shaft 7 is provided with a coupling flange 10 and two pinions 8 and 9. In the median plane between pinions 8 and 9, shaft 7 mounts a bearing 11 which supports an extended piece 12 which projects on either side of shaft 7, somewhat in the form of a beam.

Driving pinions 8 and 9 mesh respectively with compound gearwheels 13a and 13b which form the high speed gear trains. The hub of each compound gearwheel 13a, 13b is supported in a roller-mounted, self-aligning bearing 14 which is housed in an aperture embodied in beam 12, at a distance from central bearing 11 equal to the in-mesh centre distance between pinion 8 (or 9) and gearwheel 13a (or 13b). As can be seen from FIGURE 2, the two bearings 14 are diametrically opposed with reference to the centre of bearing 11.

The ends 15 and 16 of beam 12 bear against fixed supports 17 and 18 through the medium of hydraulic pressure gauging capsules 19, 20, 21 and 22. Hydraulic capsules 20 and 21 are positioned one on each side of the beam extremity 16, and capsules 19 and 22 on each side of extremity 15. Each capsule consists of an ordinary oil-filled deformable metal bellows. In addition, capsules 19 and 20 are hydraulically interconnected through a passageway 19a and capsules 21 and 22 are likewise hydraulically interconnected through a passageway 21a. In this manner, the gear-tooth reactions on the bearings 14 are taken up entirely by supports 17 and 18, the bearing 11 being called upon to support only the weights of beam 12, gearwheels 13 and their bearings 14.

The low speed output shaft 1 supports a gearwheel 23 the toothed rim of which is divided into two sections 24 and 25. Two pinions 26a and 26b mesh simultaneously with toothed sections 25 and 24 of gearwheel 23. Each of these pinions is coupled through the medium of a common shaft 41a (or 41b) to one of the compound gearwheels 13a and 13b driven by the driving pinion. Each pinion 26a (or 26b) is provided with two toothed rims 26c and 26d. The toothed rims 26c of said two pinions mesh with toothed rim 24 of low speed gearwheel 23, and toothed rims 26d of the same pinions mesh with toothed rim 25 of said low speed gear wheel 23.

Each pinion 26a (or 26b) is supported in a roller-mounted self-aligning bearing 27a (or 27b) positioned in the symmetry plane of said pinion and each of said bearings is mounted in an aperture embodied in a transverse flange 28a (or 28b). In each of said flanges is further supported a roller-mounted self-aligning bearing 30 which supports a follower train 31 (or 32) which co-operates with cylindrical tracks 33 and 34 embodied on the inner faces of the toothed sections 24 and 25 of low speed gearwheel 23. The diameters of the followers of each train 31 and 32 are such that the centre distance between shaft 1 and bearing 27a (or 27b) is equal to the correct in-mesh centre distance between pinion 26a (or 26b) and low speed gearwheel 23. The spreading forces exerted between the pinions and the low speed gearwheel result in the followers of trains 31 and 32 being applied in pressure contact against the rolling tracks 33 and 34.

Flanges 28a and 28b are positioned substantially in the median plane between each pair of toothed rim sections of pinions 26a and 26b and bear against fixed supports 35 and 36 through the medium of hydraulic pressure-gauging capsules 37, 38, 39 and 40 similar to capsules 19, 20, 21 and 22. The axes of these capsules, which are also their "lines of force," substantially intersect the axes of pinions 26a and 26b and make an angle $\alpha$ with a straight line parallel to the tangent common to the corresponding pinion 26a (or 26b) and gearwheel 23, said angle $\alpha$ being slightly smaller than the corresponding angle made by the component of the meshing reaction on bearing 27. Thus the follower trains 31 and 32 are maintained in pressure contact with tracks 33 and 34, yet are called upon to withstand minimum loads only.

The pressure-gauging capsules 37 and 38 are hydraulically interconnected through a line 37a, and this likewise applies to capsules 39 and 40 which are interconnected through a line 39a. This allows for slight angular motions of flanges 28a and 28b about the axis of shaft 1 to ensure rigorous apportionment of the forces on the two gear trains, which apportionment is automatically achieved when the same pressure prevails in the hydraulically interconnected pairs of capsules 37 and 38 or 39 and 40.

In order to allow for slight shifts due to automatic equilibration in the pressure-gauging capsules (which are but sealed metal bellows), couplings 42 and 43 with similar toothed rims are provided on the ends of each shaft 41 to couple pinions 26a and 26b to their associated gearwheels 12 and 13.

It will therefore be seen that the special disposition of the reduction gear according to this invention results in automatic alignment being obtained between the various pinions and gearwheels, together with strict apportionment of the power between the various gear trains, for, as will be well understood, by reason of the relative freedom they enjoy, the various pinions and gearwheels are able to orient themselves according to the forces brought into play and thereby ensure rigorous alignment between the toothed rims. In addition, the power split onto the gear trains is accomplished automatically, as hereinbefore described.

In cases where pinions 26a and 26b have lengths greatly exceeding their diameters, as is the case in the example illustrated in the drawings, provisions must be made for bearings additional to bearings 27a and 27b in order to avoid flexural distortions in the pinions due to the meshing forces, and consequently each of flanges 28a and 28b supports two housings 44 with their associated bearings 45.

Figure 4:
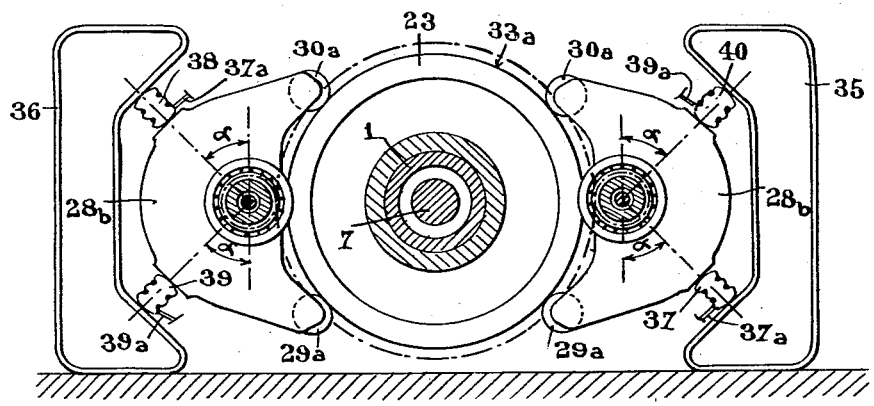
FIGURE 4 is a sectional view similar to FIGURE 3, but showing an alternative embodiment of the reduction gear.

It will of course be understood that the reduction gear of this invention is by no means limited to the specific embodiment described with reference to the accompanying drawings. By way of example, FIGURE 4 illustrates an alternative embodiment wherein the two follower trains supported by each of flanges 28a and 28b consist respectively of followers 29a and 30a which roll along a single rolling track 33a provided on the outer face of the low-speed gearwheel 23, between the two toothed rim sections 24 and 25 thereof. When this is the case, the angle $\alpha$ is slightly greater than the corresponding angle subtended by the component of the meshing reactions on bearing 27. In this way, followers 29a and 30a will be maintained in contact with rolling track 33a yet will have to withstand only very small loads.

However, as will be well understood by those skilled in the art, many modifications or substitutions may be made to the reduction gear of this invention. It is manifest, for instance, that the power may be split between three or four gear trains instead of the two gear trains of the example hereinbefore described. It is, therefore, to be understood that the description set forth hereinabove is not to be considered a limitation of the invention, but that changes may be made within the spirit and scope of the invention as set forth in the appended claims.

What I claim is:

1. A power splitting reduction gear, comprising, in combination, a low speed output shaft; a high speed input shaft; two pinions supported by said input shaft, a part shaped somewhat like a beam and disposed in the symmetrry plane through said two pinions and mounted on the high speed input shaft; fixed deformable hydraulic capsules against which bear the extremities of said beam said capsules being interconnected through passageways; at least two compound gearwheels meshing with said two pinions, the hub of each compound gearwheel being mounted within said beam and said compound gearwheels being arranged in opposite arms of said beam with a self-aligning bearing inserted between each hub and said beam; a low speed gearwheel supported by said low speed output shaft; at least two pinions disposed about said low speed gearwheel and respectively meshing therewith; coupling means between each of the latter pinions and each of the compound gearwheels; a flange disposed transversely in the symmetry plane through each of said latter pinions; a self-aligning bearing in each of said flanges, one of said latter pinions being mounted thereon; guiding followers supported by each transverse flange; on said low speed gearwheel at least one guiding track for co-operation with said guiding followers; fixed deformable hydraulic capsules against which bears each of said transverse flanges, said capsules being interconnected through passageways.

2. A reduction gear according to claim 1, wherein the output shaft is hollow and the high speed input shaft is mounted within said output shaft.

3. A reduction gear according to claim 1, wherein each transverse flange mounting a pinion meshing with the output shaft low speed gearwheel bears against two hydraulic pressure gauging-capsules the axes of which substantially intersect the pinion axis and respectively make with the tangent common to said pinion and said low speed gearwheel an angle that is slightly smaller than the corresponding angle made by the component of the meshing reactions on the pinion bearing of said flange when the follower guiding track is disposed internally to the toothed rim of the low speed gearwheel and an angle that is slightly greater when said track is disposed externally to said toothed rim.

4. A reduction gear according to claim 1, wherein the output shaft low speed gearwheel comprises two successive toothed rims and in that each pinion meshing therewith is likewise provided with two toothed rims between which is disposed the bearing supporting said pinion in the corresponding transverse flange.

5. A reduction gear according to claim 3, wherein the guiding track of the output shaft low speed gearwheel is disposed between the toothed rim portions of said low speed gearwheel.

6. A reduction gear according to claim 1 wherein the coupling between each pinion meshing with the output shaft low speed gearwheel and the corresponding high speed gearwheel is ensured by a common shaft which is rendered angularly rigid with said pinion and said gearwheel by means of couplings.

References Cited in the file of this patent

UNITED STATES PATENTS

| | | |
|---|---|---|
| 1,458,131 | Davis | June 12, 1923 |
| 2,698,526 | Beier | Jan. 4, 1955 |
| 2,844,052 | Stoeckicht | July 22, 1958 |

FOREIGN PATENTS

| | | |
|---|---|---|
| 778,856 | Great Britain | July 10, 1957 |